July 12, 1938.  F. J. PETERS  2,123,796

LICENSE PLATE FASTENER

Filed Nov. 11, 1936

INVENTOR
Fred J. Peters
By Ralph Burch
Attorney

Patented July 12, 1938

2,123,796

UNITED STATES PATENT OFFICE 2,123,796

LICENSE PLATE FASTENER

Fred J. Peters, St. Louis, Prince Edward Island, Canada, assignor of one-half to Fred C. Ramsey, Alberton, Prince Edward Island, Canada Application November 11, 1936, Serial No. 110,340
In Canada June 30, 1936

2 Claims. (Cl. 40—125)

This invention relates to improvements in a license plate fastener. Its primary object is to provide means to secure a license plate on the plate support.

Another object of the invention is to provide spring means to detachably secure an automobile license plate to the standard support means usually constructed on the chassis or body of the automobile.

With these and other objects in view that may appear while the description proceeds, the invention consists in the novel construction and design as hereinafter more specifically set forth, claimed and shown in the accompanying drawing forming part of this application and in which:—

Figure 1:
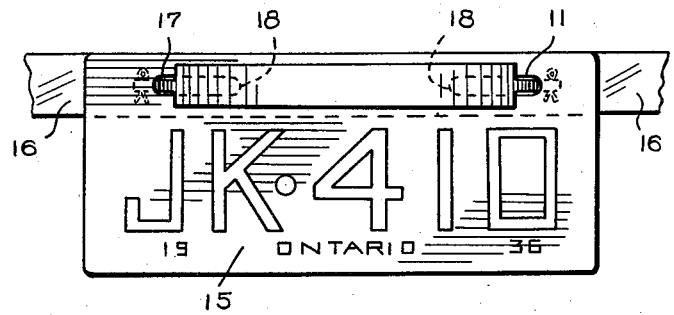
Fig. 1 is an elevation showing a license plate fastened on the support by means of my improved license plate fastener.
Figure 2:
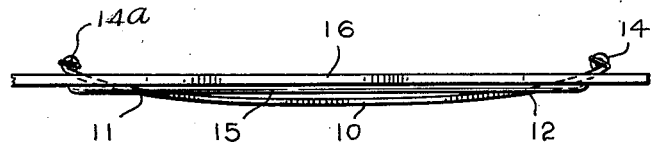
Fig. 2 is a top plan view of the same.
Figure 3:
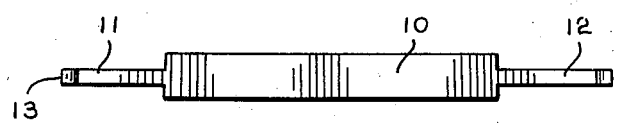
Fig. 3 is a side view of a slightly modified form of my invention.
Figure 4:
Fig. 4 is a plan view of the form of fastener shown in Fig. 3.

Referring more in detail to the drawing in which similar reference characters designate corresponding parts throughout the several views it will be seen the invention comprises an elongated strip of spring steel 10 having extending fingers 11 and 12 formed integral therewith and extending longitudinally therefrom. Said fingers may be pointed as shown at their extremities 13 or looped as shown at 14 to receive split pins 14a or other fastening means.

The license plate 15 is attached to the support 16 by the fastener member. Said plate is placed in position on the support with the orifices 17 registering with the elongated orifices 18 in the support. The member 10 is then bowed in order to insert the fingers 11 and 12 in the orifices 17 and 18. The spring action of the member 10 will tend to straighten the same when in position and will therefore, retain the license plate on the support member 16.

Figure 5:
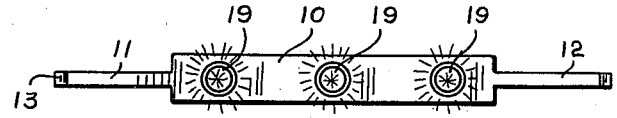
Fig. 5 is a side view of a modification of the device showing ornamental reflectors attached thereto.

In the modified forms of the invention ornamental reflectors are shown. In Fig. 5, a plurality of such reflectors 19 are attached to the member 10 in alignment with each other. These may be mounted in a small setting and screwed, riveted or welded to the member.

Figure 6:
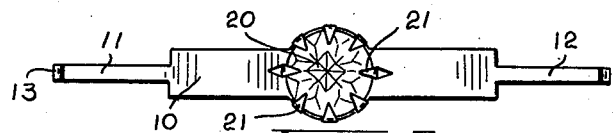
Fig. 6 is a further modification of the device showing a reflector secured thereon.

In Fig. 6, a single reflector 20 is shown, said reflector being of red or green glass as desired and cut or moulded to a suitable shape. A plurality of claws 21 are formed on the member 10 and are bent over as shown to retain the reflector in position. While only one of such reflectors is shown it is understood that any desired number of the same may be used for either ornamental or utilitarian purposes particularly when used on the rear license plate.

It will be seen from the foregoing that I have devised a useful as well as ornamental device for the purpose specified which will obviate the necessity of securing the plate on with screws and thereby facilitate the removal and replacement of the license plates when they have to be renewed. This device will also be found to be a boon to automobile merchants who must constantly be installing plates temporarily and changing the same every few days from one car to another when demonstrating the same.

It is believed that the construction and advantages of the structure may be apparent from the foregoing paragraphs taken in conjunction with the accompanying drawing without further detailed description.

While the preferred embodiments of the invention have been disclosed, it is understood that minor changes in the details of construction, combination and arrangement of co-operating parts may be resorted to within the scope of what is claimed without departing from the spirit of the invention.

I claim:—

1. In combination with an automobile license plate support bracket, a license plate having orifices adapted to register with corresponding orifices in the support bracket, a spring steel member having finger projections extending longitudinally therefrom, said projections being insertable through the orifices of said license plate and the support bracket, the ends of said projections having openings adapted to receive fastening means whereby the same are prevented from being withdrawn.

2. In combination with an automobile license plate support bracket, a license plate having orifices adapted to register with corresponding orifices in the support bracket, a spring steel member having reduced projections at each end extending longitudinally therefrom, said projections being insertable through the orifices of said license plate and the support bracket, the ends of said projections being bent to form loops and removable fastening means adapted to be inserted in the loops at the ends of the projections.

FRED J. PETERS.